United States Patent
Funayama

(10) Patent No.: US 9,471,188 B2
(45) Date of Patent: Oct. 18, 2016

(54) LIQUID CRYSTAL DISPLAY DEVICE WITH TOUCH PANEL

(71) Applicant: Japan Display Inc., Tokyo (JP)

(72) Inventor: Yukihide Funayama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/503,438

(22) Filed: Oct. 1, 2014

(65) Prior Publication Data

US 2015/0091865 A1 Apr. 2, 2015

(30) Foreign Application Priority Data

Oct. 2, 2013 (JP) .................................. 2013-207142

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0418* (2013.01)

(58) Field of Classification Search
CPC ..................................................... G06F 3/044
USPC ........................................... 345/87, 173–174
See application file for complete search history.

(56) References Cited

U.S. PATENT DOCUMENTS

| | | | |
|---|---|---|---|
| 5,534,892 A | 7/1996 | Tagawa | |
| 5,923,320 A | 7/1999 | Murakami et al. | |
| 6,501,455 B1 | 12/2002 | Nakamura | |
| 6,567,062 B1 | 5/2003 | Kudo et al. | |
| 6,670,935 B2 | 12/2003 | Yeon et al. | |
| 7,522,131 B2 | 4/2009 | Kang | |
| 8,432,347 B2 | 4/2013 | Hiraki et al. | |
| 8,902,200 B2 | 12/2014 | Miyamoto et al. | |
| 2001/0040536 A1 | 11/2001 | Tajima et al. | |
| 2003/0048370 A1 | 3/2003 | Koyama | |
| 2004/0041778 A1 | 3/2004 | Hiraki et al. | |

(Continued)

FOREIGN PATENT DOCUMENTS

| | | |
|---|---|---|
| JP | 2009-244958 A | 10/2009 |
| TW | 201222116 A | 6/2012 |
| TW | 201234249 A | 8/2012 |

OTHER PUBLICATIONS

U.S. Office Action dated Oct. 21, 2015, for related U.S. Appl. No. 14/314,304.

(Continued)

*Primary Examiner* — Michael Pervan
*Assistant Examiner* — Andrew Lee
(74) *Attorney, Agent, or Firm* — Typha IP LLC

(57) ABSTRACT

A liquid crystal display device with a touch panel includes: pixel electrodes which are disposed in each pixel disposed in a display region and to which a potential is applied depending on a gradation value; common electrodes which extend in one direction across the display region; detection electrodes which extend in a direction different from the one direction across the display region, form an electric capacitance with driving electrodes that are a part of the common electrodes, and detect a contact position on a panel; a liquid crystal layer that is formed by a liquid crystal composition in which an orientation is changed by an electric field formed by the pixel electrodes and the common electrodes; and a driving pulse output section that applies a driving pulse once to the driving electrodes for detecting contact within two successive horizontal synchronizing periods that are periods of display.

5 Claims, 10 Drawing Sheets

(56) References Cited

U.S. PATENT DOCUMENTS

| | | | |
|---|---|---|---|
| 2007/0091013 A1 | 4/2007 | Pak et al. | |
| 2010/0265212 A1 | 10/2010 | Sekiguchi et al. | |
| 2011/0157064 A1* | 6/2011 | Imai | G06F 3/0416 345/173 |
| 2011/0205208 A1* | 8/2011 | Iisaka | G09G 3/3611 345/211 |
| 2011/0267295 A1* | 11/2011 | Noguchi | G06F 3/0416 345/173 |
| 2012/0262390 A1 | 10/2012 | Kida et al. | |
| 2014/0015768 A1* | 1/2014 | Karpin | G06F 3/0418 345/173 |
| 2014/0022188 A1* | 1/2014 | Ahn | G06F 3/0416 345/173 |
| 2014/0035862 A1* | 2/2014 | Jeong | G01R 27/26 345/174 |

OTHER PUBLICATIONS

Taiwanese Office Action dated Dec. 18, 2015, for corresponding Taiwanese Patent Application No. 103132129. Concise explanations of related Foreign Documents are found within the English Translation of this Office Action.

\* cited by examiner

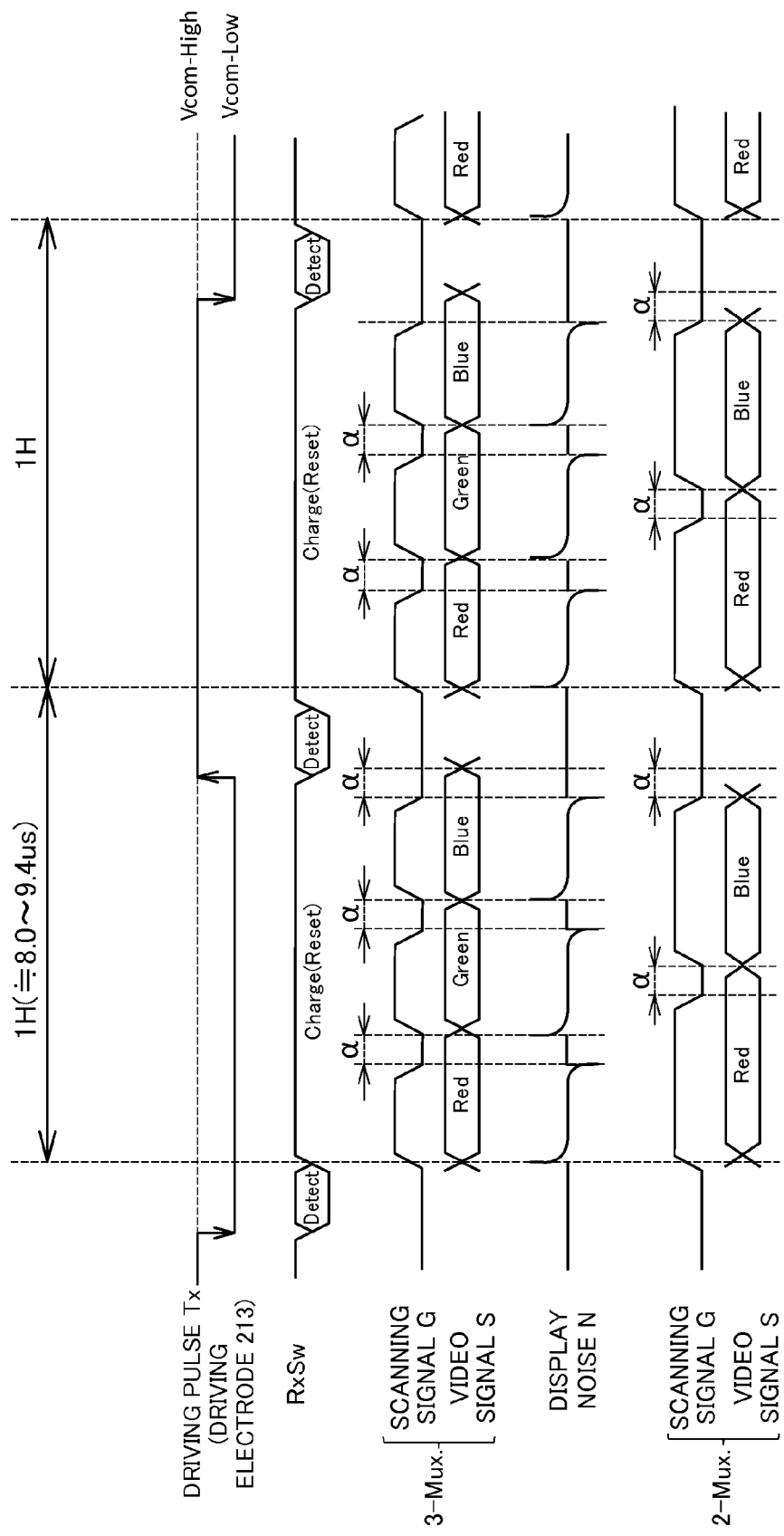

LIQUID CRYSTAL DISPLAY DEVICE WITH TOUCH PANEL

CROSS-REFERENCE TO RELATED APPLICATION

The present application claims priority from Japanese application JP2013-207142 filed on Oct. 2, 2013, the content of which is hereby incorporated by reference into this application.

BACKGROUND OF THE INVENTION

1. Field of the Invention

The present invention relates to a liquid crystal display device with a touch panel.

2. Description of the Related Art

A display device having, as an input device, a touch panel that is disposed so as to be overlapped on a display screen of an information communication terminal such as a computer is widely used. Liquid crystal display devices that are generally used as the display device are devices displaying an image by changing an orientation of a liquid crystal composition that is sealed between two substrates of a thin film transistor substrate (hereinafter, referred to as a TFT substrate) and a color filter substrate depending on a change in an electric field and by controlling a degree of transmission of light passing through the liquid crystal composition. Among them, in an In Plane Switching (IPS) system in which both a pixel electrode and a common electrode are disposed on the TFT substrate side, the electrodes forma so-called horizontal electric field and a display having a wide viewing angle is realized.

The touch panel is an input device that causes a processing device to perform a process by recognizing coordinates on a panel that is touched with the fingers of a user and the like. In the touch panel, a resistance film system that detects a change in a resistance value of a portion that is touched, an optical sensor system that detects a change in light intensity of a portion that is blocked by a touch, an electrostatic capacitive coupling system that detects a change in capacitance, and the like are known. The electrostatic capacitive coupling system is widely used because transmittance of the panel is high, display quality is not reduced, and durability thereof is high without coming into contact with other electrodes.

In the related art, a liquid crystal display device with a touch panel of a further thin type is required for satisfying a demand of a miniaturization and a thinning of an information communication terminal. In the liquid crystal display device of the IPS system in JP 2009-244958 A, a liquid crystal display device with a touch panel is disclosed, which is further thinned by using a common electrode of the liquid crystal display device as a driving electrode of the touch panel.

SUMMARY OF THE INVENTION

In the touch panel in the liquid crystal display device with a touch panel, in order to avoid an influence of electromagnetic waves generated in a display operation, scanning of the electrode of the touch panel is performed by avoiding the electromagnetic waves of the display operation with reference to a timing of a horizontal synchronizing signal that is used for display. Thus, a driving frequency of the touch panel is a period of the horizontal synchronizing signal and, for example, if a frequency of an external noise such as a so-called alternate current (AC) charge noise generated during charging is an integer multiple of the frequency of the horizontal synchronizing signal, there is a concern that a false detection occurs in touch detection.

The present invention is made in view of the above circumstances and an object of the invention is to provide a liquid crystal display device with a touch panel in which a false detection is suppressed and accuracy of an operation thereof is improved.

A liquid crystal display device with a touchpanel of the present invention includes: pixel electrodes that are a plurality of electrodes which are disposed in each pixel disposed in a display region and to which a potential is applied depending on a gradation value; common electrodes that are a plurality of electrodes which extend in one direction across the display region; detection electrodes that are a plurality of electrodes which extend in a direction different from an electric capacitance with the one direction across the display region, form driving electrodes that are a part of the common electrodes, and detect a contact position on a panel; a liquid crystal layer that is formed by a liquid crystal composition in which an orientation is changed by an electric field formed by the pixel electrodes and the common electrodes; and a driving pulse output section that applies a driving pulse once to the driving electrodes for detecting contact within two successive horizontal synchronizing periods that are periods of display.

Furthermore, the liquid crystal display device with a touch panel of the present invention may further include: a detection circuit that detects a touch by integrating a change in the potential of the detection electrodes on both of a rising and a falling of the driving pulse applied to the driving electrodes.

Furthermore, in the liquid crystal display device with a touch panel of the present invention, the detection circuit may have a rising detection circuit that detects an electrical response in the detection electrodes on the rising of the driving pulse and a falling detection circuit that detects the electrical response in the detection electrodes on the falling of the driving pulse, and each of the rising detection circuit and the falling detection circuit may have a comparator and a capacitance that is connected in parallel with the comparator.

Furthermore, in the liquid crystal display device with a touch panel of the present invention, the driving pulse output section may generate the change in the potential of one of the rising and the falling of the driving pulse, after writing of the potential is completed with respect to the pixel electrodes depending on the gradation value.

Furthermore, in the liquid crystal display device with a touch panel of the present invention, the driving pulse output section may generate the change in the potential of one of the rising and the falling of the driving pulse, before writing of a potential depending on the gradation value is completed with respect to the pixel electrodes while the potential depending on the gradation value is applied to the pixel electrodes.

Furthermore, the liquid crystal display device with a touch panel of the present invention may further include: a dummy electrode that detects noise; a noise frequency detection section that detects a frequency of the noise detected by the dummy electrode; and a frame frequency control section that sets a frame frequency based on the frequency detected by the noise frequency detection section.

BRIEF DESCRIPTION OF THE DRAWINGS

FIG. 10 is a timing chart illustrating an example of a display control signal applying the display driving control of FIG. 9.

DETAILED DESCRIPTION OF THE INVENTION

Figure 1:
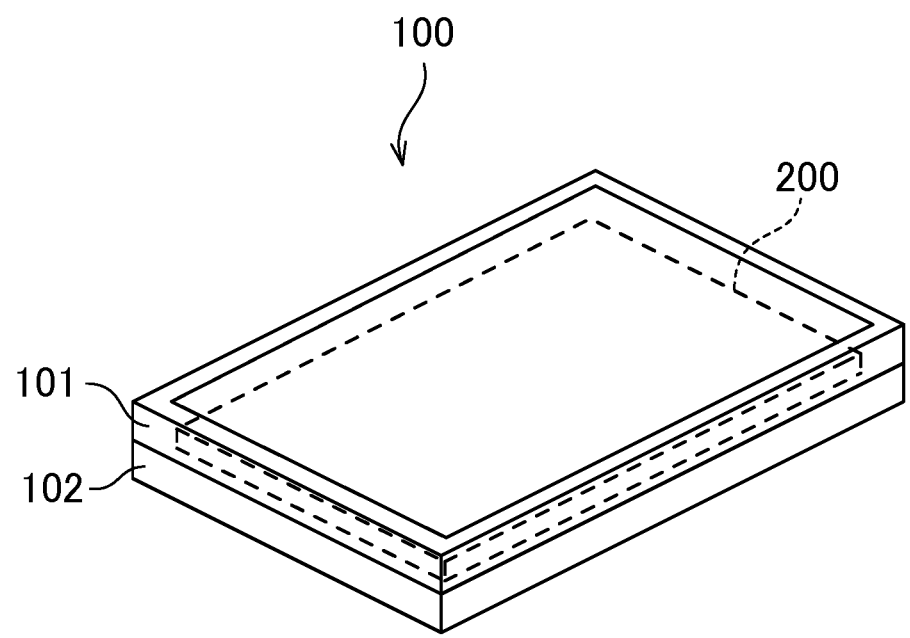
FIG. 1 is a view illustrating a liquid crystal display device with a touch panel according to a first embodiment of the present invention.

Hereinafter, an embodiment of the present invention will be described with reference to the drawings. Moreover, in the drawings, the same reference characters are given to the same or equivalent elements and redundant descriptions will be omitted.

First Embodiment

FIG. 1 is a view illustrating a liquid crystal display device 100 with a touch panel according to a first embodiment of the present invention. As illustrated in the view, the liquid crystal display device 100 with the touch panel is configured of a liquid crystal display panel 200 with the touch panel, and an upper frame 101 and a lower frame 102 that fix the liquid crystal display panel 200 with the touch panel so as to sandwich the liquid crystal display panel 200 with the touch panel.

Figure 2:
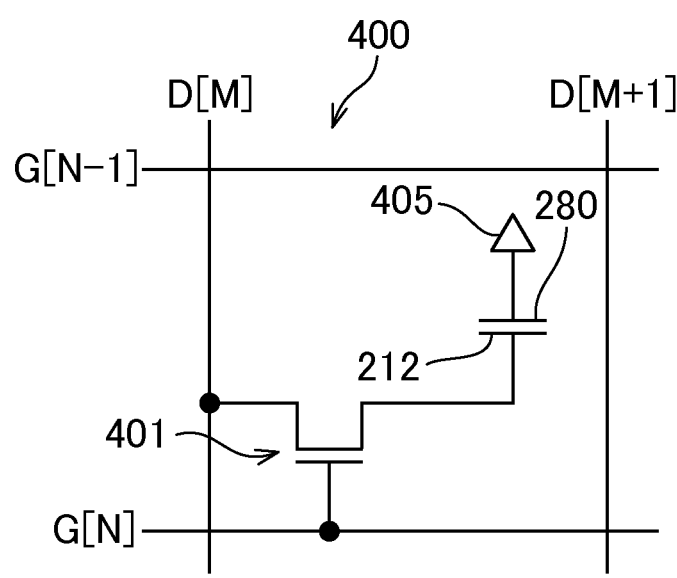
FIG. 2 is a diagram schematically illustrating a circuit of a pixel formed in a TFT substrate.

Next, a basic circuit of a liquid crystal display of an IPS system will be schematically described. The liquid crystal display panel 200 with the touch panel has a TFT substrate 210 (see FIG. 4) in which a thin film transistor (TFT) is formed, and FIG. 2 is a diagram schematically illustrating a circuit of a pixel 400 formed in the TFT substrate 210. Each pixel 400 has a pixel electrode 212 to which a gradation voltage corresponding to a gradation value is applied, a common electrode 280 that forms an electric field between the pixel electrode 212 and the common electrode 280, a pixel transistor 401 which has a gate, a source and a drain, and a common electrode wiring 405 that is connected to the common electrode 280 and that is kept to a common potential. With respect to the pixel transistor 401, a scanning signal line G[N] is connected to the gate and one of the source and the drain is connected to a data signal line D[M] and the other is connected to the pixel electrode 212. Moreover, FIG. 2 schematically indicates a representative circuit in the liquid crystal display device of the IPS system in which both the pixel electrode 212 and the common electrode 280 are formed in the TFT substrate 210, but other circuits may be used.

Figure 3:
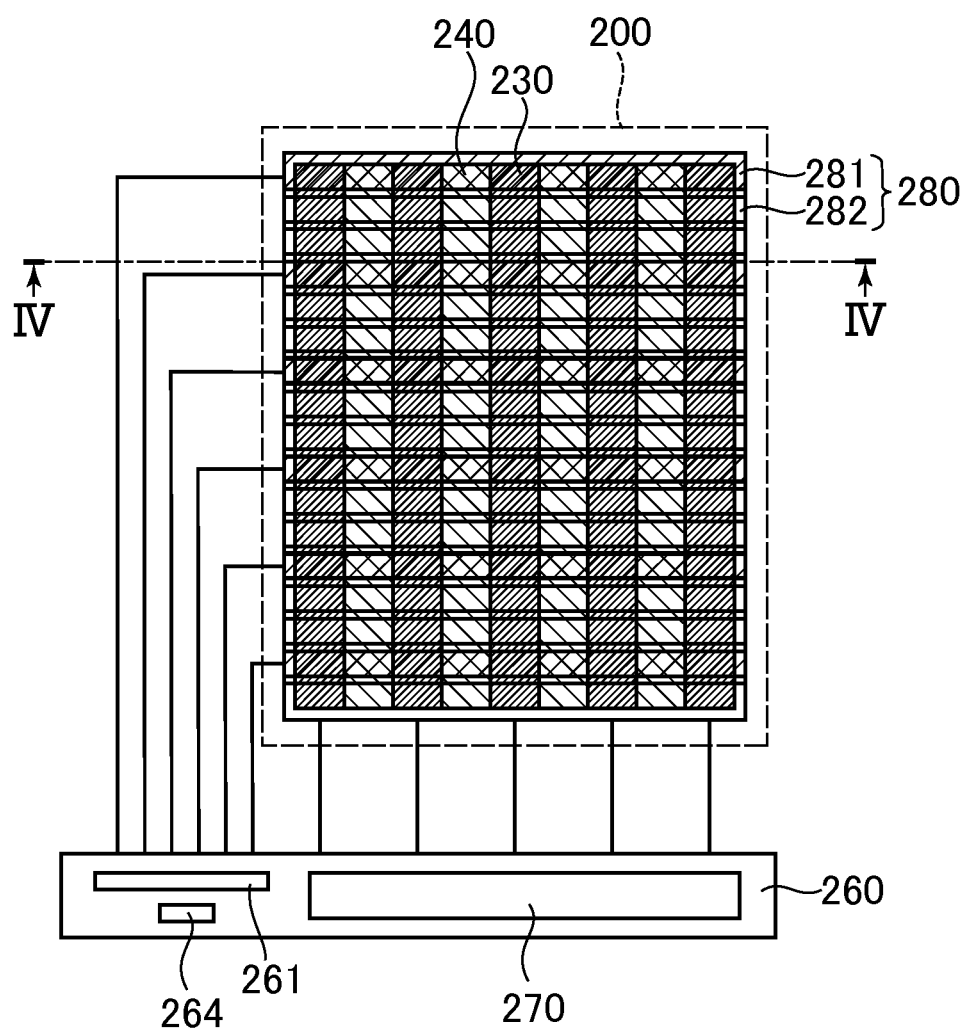
FIG. 3 is a plan view illustrating an arrangement of electrodes that are used for detection of a touch of a touch panel.

FIG. 3 is a plan view illustrating an arrangement of electrodes that are used for the detection of a touch of a touch panel. The common electrode 280 used in the liquid crystal display has a driving electrode 281 which has a rectangular shape extending in a direction of a short side of a display region and to which a voltage is applied from a touch panel control section 260, and rectangular-shaped non-driving electrodes 282 which are electrodes other than the driving electrode 281 and extend in the direction of the short side of the display region. The display region is lined with these electrodes.

On the other hand, in a layer other than the layer in which the common electrode 280 is disposed, a plurality of detection electrodes 230 that extend in a longitudinal direction of the display region and are arranged in the direction of the short side of the display region, and a plurality of dummy electrodes 240 that are disposed between the detection electrodes 230 and arranged to extend in the same direction as the detection electrodes 230 are formed. Signals detected by the detection electrodes 230 are input to the touch panel control section 260 for each detection electrode 230 and touch coordinates are calculated. The dummy electrodes 240 may be electrically floated or may be grounded. When being floated, a function of auxiliary capacity is provided when detecting the touch. Moreover, each of the driving electrode 281, the non-driving electrode 282, the detection electrode 230, and the dummy electrode 240 is formed using a transparent conductive material such as Indium Tin Oxide (ITO). Furthermore, each electrode may be configured as a bundle of conductive lines in which a plurality of conductive lines are disposed at predetermined intervals.

Furthermore, the touch panel control section 260 has a driving pulse output section 261 that applies driving pulses in order with respect to each driving electrode 281, a detection circuit 270 that integrates the signals detected in the detection electrode 230, a register 264 in which parameters of controlling such as output timing of the driving pulse are stored, and a calculation processing section (not illustrated) that calculates the presence or absence of a touch and the position of the touch on a display surface based on an output of the detection circuit 270.

Figure 4:
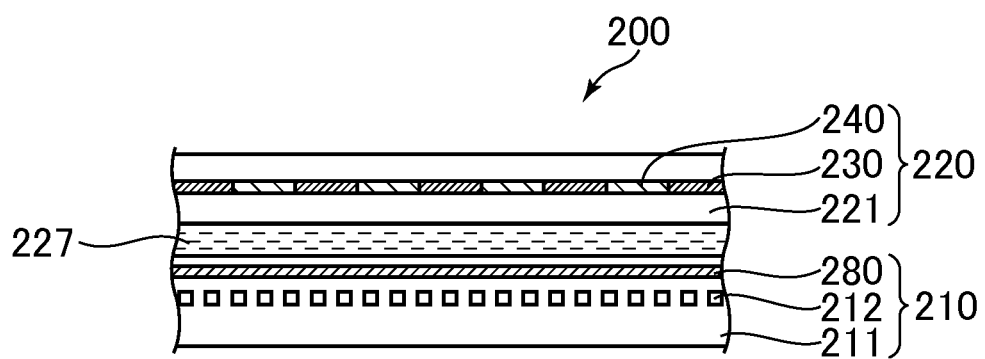
FIG. 4 is a view schematically illustrating a cross section taken along line IV-IV of FIG. 3.

FIG. 4 schematically illustrates a cross section taken along line IV-IV of FIG. 3. As illustrated in the view, the liquid crystal display panel 200 with the touch panel is configured of the TFT substrate 210, a counter substrate 220 that emits filtered incident light as light having a wavelength of each color of RGB for each pixel by a color filter (not illustrated), and a liquid crystal layer 227 that is formed by the liquid crystal composition sealed between the substrates. Here, as illustrated in FIG. 4, the pixel electrode 212 and the common electrode 280 in the liquid crystal display are formed on a glass substrate 211 in the TFT substrate 210, and the detection electrode 230 and the dummy electrode 240 are formed on a glass substrate 221 in the counter substrate 220.

Figure 5:
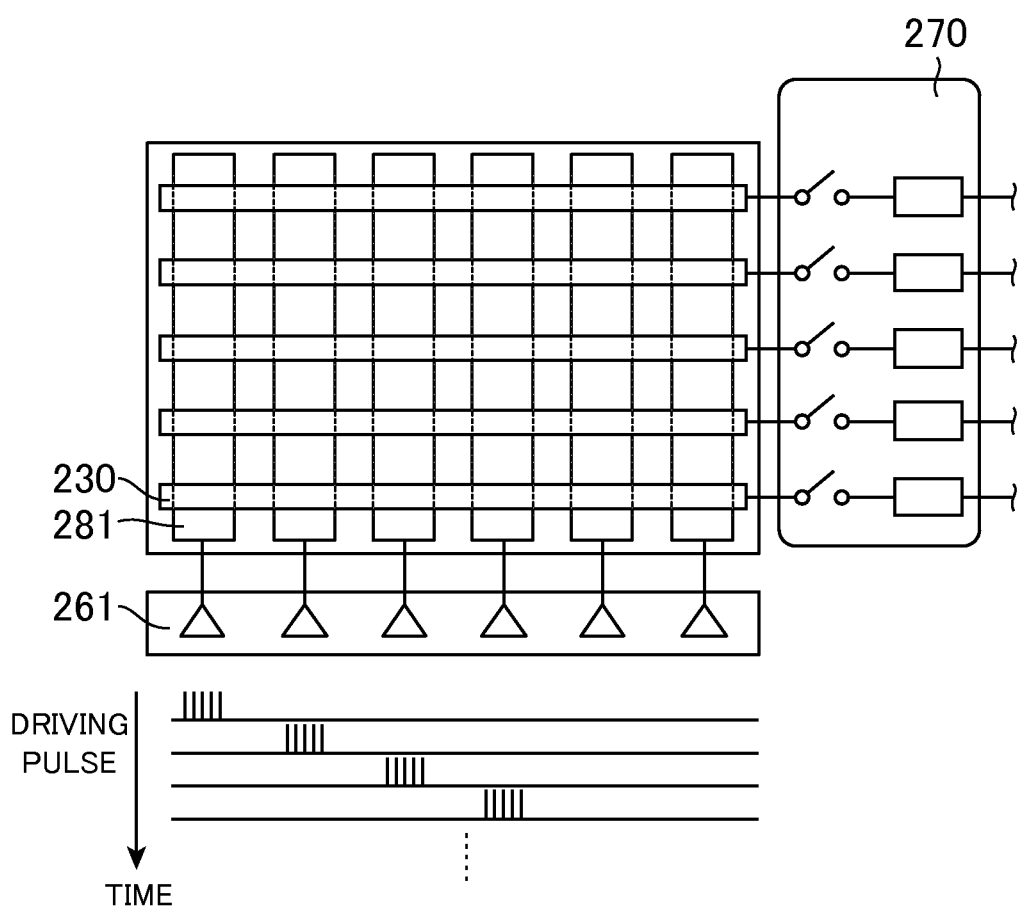
FIG. 5 is a schematic diagram for describing an operation of the detection of the touch.

FIG. 5 is a schematic diagram for describing an operation of the detection of the touch. As illustrated in the diagram, the driving pulse output section 261 applies a plurality of driving pulses in order to each driving electrode 281 and cumulates a response detected in the detection electrode 230 in the detection circuit 270, and determines the presence or absence of a touch.

Figure 6:
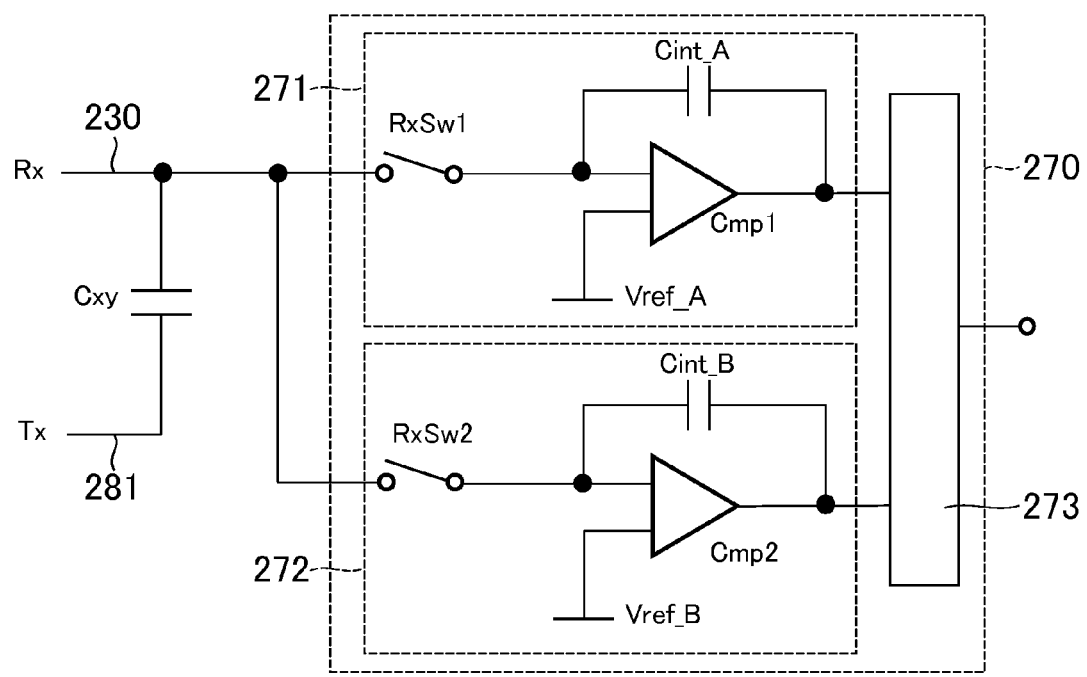
FIG. 6 is a diagram illustrating a configuration of a detection circuit.

FIG. 6 is a diagram illustrating a configuration of the detection circuit 270. As illustrated in the diagram, the detection circuit 270 is configured of a rising detection circuit 271, a falling detection circuit 272, and a sample hold circuit 273. The rising detection circuit 271 is configured of a first detection switch RxSw1 that is turned ON when a driving pulse of a drive signal Tx rises, a first comparator Cmp1, and a first integral capacitance Cint_A. In the circuit, responses in the detection electrode 230 with respect to a plurality of times of driving pulses applied to the driving electrode 281 are accumulated in the first integral capacitance Cint_A, the responses are compared to a first reference voltage Vref_A in the comparator Cmp1, and the responses are output to the sample hold circuit 273. Thereafter, in the calculation processing section, the signal output from the sample hold circuit 273 is calculated and the presence or absence of a touch, and the position of the touch in the display surface is calculated. The falling detection circuit 272 is configured of a second detection switch RxSw2 that is turned ON when the pulse of the drive signal Tx falls, a second comparator Cmp2, and a second integral capacitance Cint_B, andperforms the same operation as that of the rising detection circuit 271. Here, in FIG. 6, a symbol Cxy represents a capacitance between the driving electrode 281 and the detection electrode 230.

Figure 7:
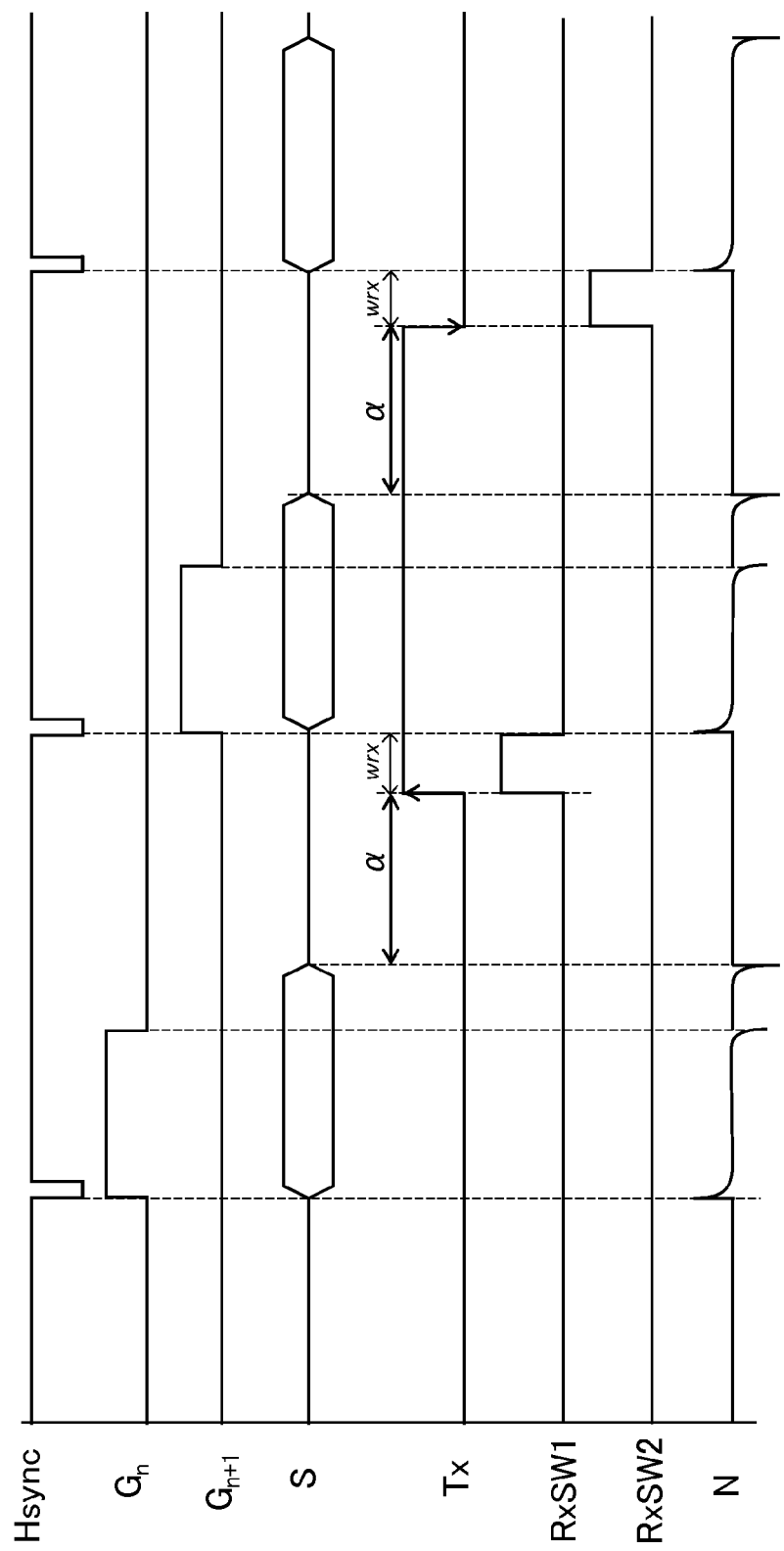
FIG. 7 is a timing chart for describing a driving pulse applied to a driving electrode.

FIG. 7 is a timing chart for describing the driving pulse applied to a driving electrode 281. In the timing chart, a change in each signal is represented for a horizontal synchronizing signal Hsync in the liquid crystal display, scanning signals Gn and Gn+1 applied to adjacent scanning signal lines G of the display device, a video signal S applied to a signal line D, the drive signal Tx applied to the driving electrode 281, control signals of the first detection switch RxSW1 and the second detection switch RxSW2, and a display noise N.

As illustrated in the timing chart, in the display control, a scanning signal line driving pulse is sequentially applied to the scanning signals Gn and Gn+1 and the video signal S is applied corresponding thereto, synchronized with the horizontal synchronizing signal Hsync. The display noise N is generated according to the timing of the change in the scanning signals Gn and Gn+1, and the video signal S. The drive signal Tx is output such that there is one change in a stable period α in which the display noise N is relatively small until the output of the video signal S is stopped and the next video signal S is output. In the drive signal Tx, that is, one of the rising and the falling is generated once in the stable period α and one pulse is output in two horizontal synchronizing periods (2H). The control signal of the first detection switch RxSW1 is a High potential according to the drive signal Tx of the rising so that the response thereof can be obtained from the detection electrode 230, and the first detection switch RxSW1 is turned ON. A second control signal of the second detection switch RxSW2 is a High potential according to the drive signal Tx of the falling so that the response thereof can be obtained from the detection electrode 230, and the second detection switch RxSW2 is turned ON.

Here, in order to avoid including the display noise N in the detection signal, the control signal of the first detection switch RxSW1 and the second detection switch RxSW2 is necessary to be a Low potential (OFF) before the video signal S is output and the timing of the change in the drive signal Tx should be earlier by an amount of a pulse width wrx of the control signal from the start of the video signal S. The stable period α is determined considering the pulse width wrx of the control signal.

Therefore, since the touch panel control section 260 can output the driving pulse which has a period different from the period of the display, even if an external noise which has an integral multiple of the period of the display exists, it is possible to suppress false detection. Furthermore, since only one of the rising and the falling are disposed in the stable period α, it is easy to avoid display noise, accuracy of an operation is improved by suppressing the false detection, and accuracy of detection coordinates can be improved. Furthermore, since only one of the rising and the falling is disposed, the arrangement is easily performed and it is possible to correspond to high resolution of the display device even if the stable period α is short.

Figure 8:
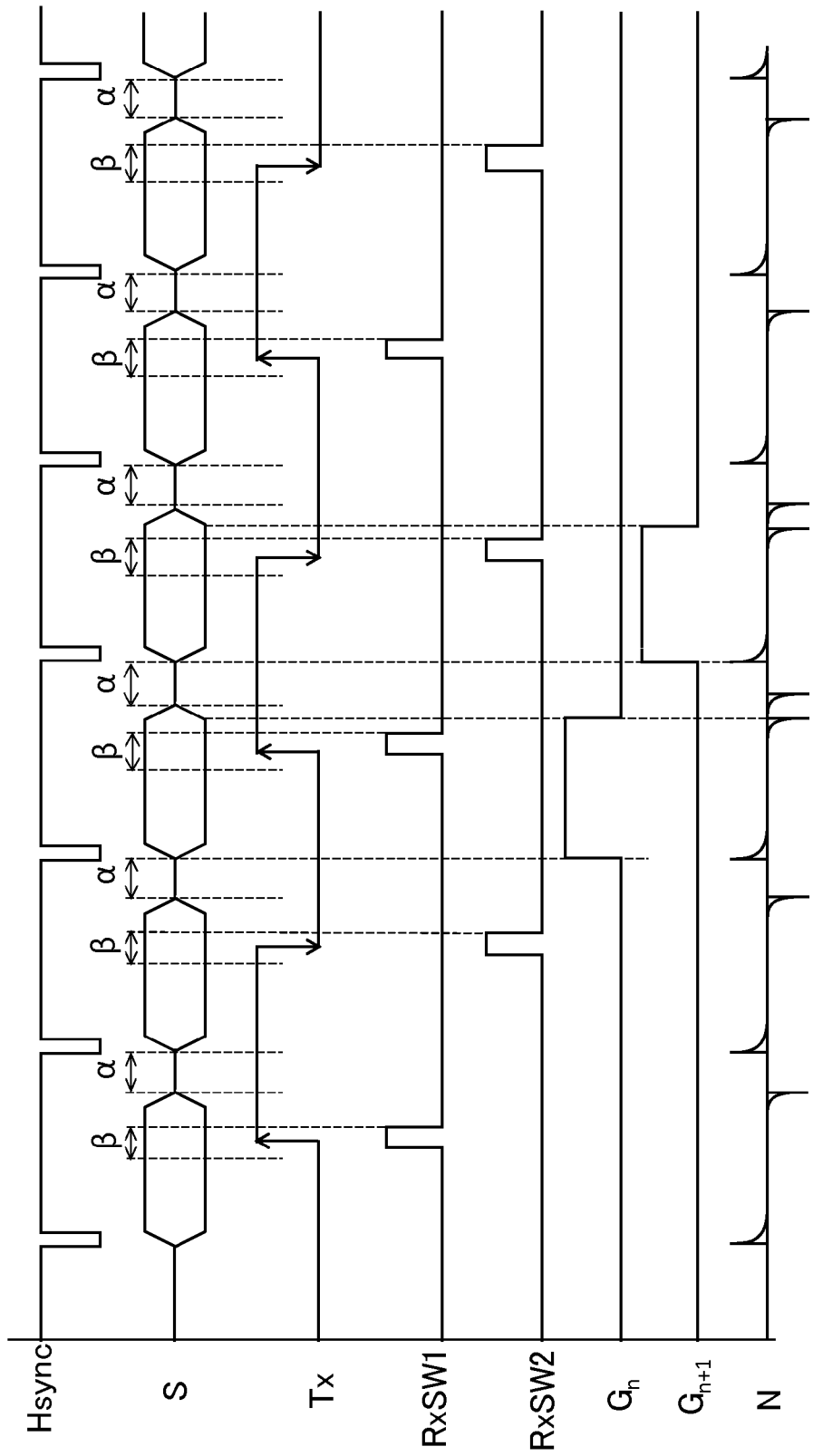
FIG. 8 is a timing chart of a driving pulse in a modification example of the embodiment.

FIG. 8 is a timing chart of a driving pulse in a modification example of the embodiment. In the modification example, a stable period β is defined rather than the stable period α represented in FIG. 7 and one of the rising and falling of the driving pulse is disposed in each stable period β. The stable period β is set as a period before the falling of a scanning signal Gn occurs after display noise N is stable by applying a video signal S to a video signal line. Moreover, in the timing chart, description of a pulse width wrx of the control signal is omitted, but the pulse width wrx is also considered in the definition of stable period β. It is possible to obtain the same effects as those of the above embodiment even if one of the rising and falling of the driving pulse of the touch panel is disposed in such a stable period β. Specifically, in the display device in which a time (writing time) when the video signal S is applied is long, it is effective that the rising and falling of the drive pulse is disposed in the stable period β. Here, in the modification example, the rising and falling of the driving pulse is disposed only in the stable period β, but the rising or falling of the driving pulse may be set by combining the stable periods α and β. In this case, it is possible to further freely change the period of the driving pulse.

Second Embodiment

Figure 9:
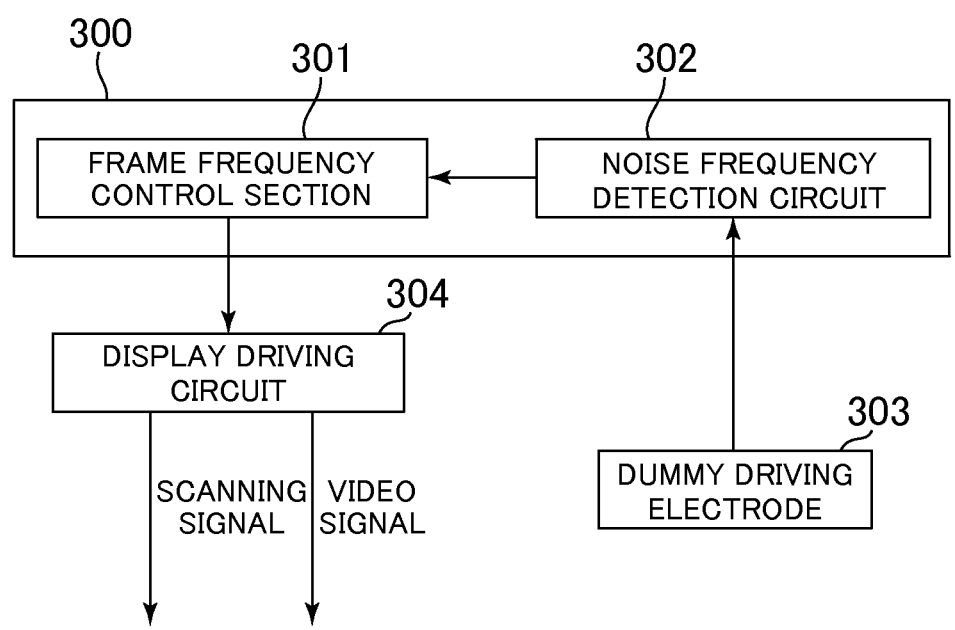
FIG. 9 is a block diagram for describing display driving control of a liquid crystal display device with a touch panel according to a second embodiment of the invention.

FIG. 9 is a block diagram for describing display driving control of a liquid crystal display device with a touch panel according to a second embodiment of the present invention. Since an entire configuration of liquid crystal display device with the touch panel and the touch detection operation are the same as those in FIGS. 1 to 4 and of the first embodiment indicated in the description thereof, the description will be omitted. As illustrated in FIG. 9, the display driving control according to the embodiment is performed by using a timing control section 300, a dummy driving electrode 303 disposed on a glass substrate 221, and a display driving circuit 304. External noise such as AC charge noise detected in the dummy driving electrode 303 is input to a noise frequency detection circuit 302 in the timing control section 300 and the frequency of the external noise is calculated. The calculated frequency is notified to a frame frequency control section 301 and, the frame frequency which does not raises false detection and in which, for example, the horizontal synchronizing signal is not to be integer multiples of the noise frequency or the noise frequency divided by an integral number is selected based on the calculated frequency, and the display driving circuit is operated with the frame frequency. The display driving circuit outputs the scanning signal and the video signal so that the display operation is performed with a designated frame frequency. Moreover, the detection of the noise frequency and the control of the frame frequency may be periodically performed and may be performed only when a mobile terminal including the liquid crystal display device with the touch panel of the embodiment is connected to a charger, for example, as an object to suppress the false detection due to AC charge noise. The selected frame frequency may be, for example, selected from candidates of a plurality of frame frequencies stored in a register and the like.

FIG. 10 is a timing chart illustrating an example of a display control signal applying the display driving control of FIG. 9. As shown, 3-Mux represents a case of RGB three switches and 2-Mux represents a case of RG switch terminals of RGB two switches. A range in which the frame frequency is controlled is a range of 55 Hz to 65 Hz and corresponds to 8.0 μs to 9.4 μs in one horizontal synchronizing period. As described above, it is possible to suppress the false detection in the detection circuit 270 due to the frequency of the external noise by changing the frame frequency based on the frequency of the external noise.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device with a touch panel comprising:
    pixel electrodes that are a plurality of electrodes which are disposed in each pixel disposed in a display region and to which a potential is applied depending on a gradation value;
    common electrodes that are a plurality of electrodes which extend in one direction across the display region;
    detection electrodes that are a plurality of electrodes which extend in a direction different from the one direction across the display region, form an electric capacitance with driving electrodes that are a part of the common electrodes, and detect a contact position on a panel;
    a liquid crystal layer that is formed by a liquid crystal composition in which an orientation is changed by an electric field formed by the pixel electrodes and the common electrodes;
    a detection circuit that includes a rising detection circuit and a falling detection circuit; and
    a driving pulse output section that applies a driving pulse once to the driving electrodes for detecting contact within two successive horizontal synchronizing periods that are periods of display,
    wherein the rising detection circuit includes a first integral capacitance and a first switch electrically connected to the detection electrodes,
    wherein the falling detection circuit includes a second integral capacitance and a second switch electrically connected to the detection electrodes,
    wherein the driving pulse output section generates the change in the potential of one of the rising and the falling of the driving pulse, before writing of a potential depending on the gradation value which is applied to the pixel electrodes, and
    wherein the first switch is in ON state between the rising and the following writing, and the second switch is in ON state between the falling and the following writing.

2. The liquid crystal display device with a touch panel according to claim 1, further comprising:
    the detection circuit detects a touch by integrating a change in the potential of the detection electrodes on both of rising and falling of the driving pulse applied to the driving electrodes.

3. The liquid crystal display device with a touch panel according to claim 2,
    wherein the rising detection circuit detects an electrical response in the detection electrodes on the rising of the driving pulse and falling detection circuit detects an electrical response in the detection electrodes on the falling of the driving pulse,
    wherein the rising detection circuit further includes a comparator that is connected in parallel with the first integral capacitance, and
    wherein the falling detection circuit further includes a comparator that is connected in parallel with the second integral capacitance.

4. The liquid crystal display device with a touch panel according to claim 1,
    wherein the driving pulse output section generates the change in the potential of one of the rising and the falling of the driving pulse, after writing of the potential is completed with respect to the pixel electrodes depending on the gradation value.

5. The organic electroluminescence display device according to claim 1, further comprising:
    a dummy electrode that detects noise;
    a noise frequency detection section that detects a frequency of the noise detected by the dummy electrode; and
    a frame frequency control section that sets a frame frequency based on the frequency detected by the noise frequency detection section.

* * * * *